US012567394B2

(12) United States Patent
Li et al.

(10) Patent No.: US 12,567,394 B2
(45) Date of Patent: Mar. 3, 2026

(54) CONVERTING AUDIO SAMPLES TO FULL SONG ARRANGEMENTS

(71) Applicant: Lemon Inc., Grand Cayman (KY)

(72) Inventors: Bochen Li, Los Angeles, CA (US); Andrew Shaw, Los Angeles, CA (US); Jitong Chen, Los Angeles, CA (US)

(73) Assignee: LEMON INC., Grand Cayman (KY)

( * ) Notice: Subject to any disclaimer, the term of this patent is extended or adjusted under 35 U.S.C. 154(b) by 927 days.

(21) Appl. No.: 17/737,216

(22) Filed: May 5, 2022

(65) Prior Publication Data

US 2023/0360620 A1 Nov. 9, 2023

(51) Int. Cl.
*G10H 1/00* (2006.01)
*G10H 1/38* (2006.01)

(52) U.S. Cl.
CPC ............. *G10H 1/0025* (2013.01); *G10H 1/38* (2013.01); *G10H 2250/311* (2013.01)

(58) Field of Classification Search
CPC ... G10H 1/0025; G10H 1/38; G10H 2250/311
See application file for complete search history.

(56) References Cited

U.S. PATENT DOCUMENTS

| | | | | |
|---|---|---|---|---|
| 5,719,346 A * | 2/1998 | Yoshida | G10H 1/10 | 84/634 |
| 6,441,289 B1 * | 8/2002 | Shinsky | G10H 1/0058 | 84/464 R |
| 10,818,308 B1 * | 10/2020 | Chu | G10L 15/26 | |
| 2010/0192755 A1 * | 8/2010 | Morris | G10H 1/0025 | 84/637 |
| 2014/0053711 A1 * | 2/2014 | Serletic, II | G09B 15/00 | 84/613 |
| 2014/0074459 A1 * | 3/2014 | Chordia | G10L 21/055 | 704/203 |
| 2017/0213534 A1 * | 7/2017 | Braasch | G10H 1/42 | |
| 2021/0208842 A1 * | 7/2021 | Cassidy | G11B 27/28 | |

FOREIGN PATENT DOCUMENTS

WO WO-2019182390 A2 * 9/2019 ............... G10H 1/02

OTHER PUBLICATIONS

Carsault T. et al., Combining Real-Time Extraction and Prediction of Musical Chord Progressions for Creative Applications, Oct. 28, 2021, vol. 10, No. 2634, pp. 1-33 [Retrieved on Sep. 27, 2023] <DOI: /10.3390/ELECTRONICS10212634> 3. Musical Motivation: Inform Human-Machine Music Co-Improvisation, 4.3.

(Continued)

*Primary Examiner* — Jeffrey Donels
*Assistant Examiner* — Philip G Scoles
(74) *Attorney, Agent, or Firm* — Faegre Drinker Biddle & Reath LLP

(57) ABSTRACT

In examples, a method for converting audio samples to full song arrangements is provided. The method includes receiving audio sample data, determining a melodic transcription, based on the audio sample data, and determining a sequence of music chords, based on the melodic transcription. The method further includes generating a full song arrangement, based on the sequence of music chords, and the audio sample data.

20 Claims, 12 Drawing Sheets

(56) References Cited

OTHER PUBLICATIONS

Hum2Song Multi-track Polyphonic Music Generation from Voice Melody Transcription with Neural Networks. Dec. 17, 2018 [Retrieved on Sep. 27, 2023 from https://medium.com/@carlostoxtli/hum2songmulti-track-polyphonic-music-generation-from-voice-melody-transcription-withneural-7a777445550b].
Automatic Chord Recognition with Fully Convolutional Neural Networks. Sep. 25, 2020 [Retrieved on Sep. 27, 2023 from https://www.static.tu.berlin/fileadmin/www/10002020/Dokumente/Abschlussarbeiten/Masterarbeit_Hamed_Fard_final.pdf].
International Search Report mailed Sep. 28, 2023 in International Application No. PCT/SG2023/050307.

* cited by examiner

CONVERTING AUDIO SAMPLES TO FULL SONG ARRANGEMENTS

BACKGROUND

Vocal to song generators are automated systems that take improvised vocal input and create fully productionized songs. Automated song generation from user vocal input is important to lower the music creation barrier. However, conventional automated song generation systems and methods may require structure vocal input (e.g., a reference beat and/or a reference key). Further, conventional automated song generation systems and methods may be unable to generate full accompaniments to songs including, for example, harmonization, arpeggiation, percussion, etc.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for converting audio samples to full song arrangements.

In some examples, a method for converting audio samples to full song arrangements is provided. The method includes receiving audio sample data, determining a melodic transcription, based on the audio sample data, and determining a sequence of music chords, based on the melodic transcription. The method further includes generating a full song arrangement, based on the sequence of music chords, and the audio sample data.

In some examples, a system for converting audio samples to full song arrangements is provided. The system includes at least one processor and memory storing instructions that, when executed by the at least one processor, causes the system to perform a set of operations. The set of operations include receiving audio sample data, determining a melodic transcription, based on the audio sample data, and determining a sequence of music chords, based on the melodic transcription. The set of operations further include generating a full song arrangement, based on the sequence of music chords, and the audio sample data.

In some examples, one or more computer readable non-transitory storage media are provided. The one or more computer readable non-transitory storage media embody software that is operable when executed, by at least one processor of a device, to receive audio sample data, determine a melodic transcription, based on the audio sample data, determine a sequence of music chords, based on the melodic transcription, and generate a full song arrangement, based on the sequence of music chords and the audio sample data.

In some examples, the determining of the sequence of music chords includes determining, using a trained machine learning model, chord candidates, for each bar of the melodic transcription, and determining, using pre-defined chord progressions, one or more chord progressions corresponding to the determined chord candidates. The sequence of music chords may be one or more of the one or more chord progressions.

In some examples, the pre-defined chord progressions are 4-bar chord progressions.

In some examples, the trained machine learning model is a neural network that is trained based on a data set of paired melody bars and chords.

In some examples, the chords in the data set include maj, min, 7, min7, min7b5, aug, and sus4.

Some examples further include displaying a user-interface, receiving, via the user-interface, a user-input corresponding to a selection of an accompaniment style of the full song arrangement, and re-generating the full song arrangement, based on the user-input.

In some examples, the audio sample data includes a subset of data that corresponds to auditory words.

Some examples further include performing vocal processing on the audio sample data. The vocal processing includes removing a subset of the audio sample data corresponding to ambient noise. The vocal processing may further include, performing autotuning on the audio sample data, normalizing a volume of the audio sample data, performing dynamic time warping on the audio sample data, and/or beautifying the audio sample data, by applying one or more vocal effects from the group of: compressor adjustment, reverb adjustment, and chorus adjustment.

In some examples, the generating of the full song arrangement is based on the sequence of music chords, and the vocally processed audio sample data.

Some examples further include transmitting the full song arrangement to a device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
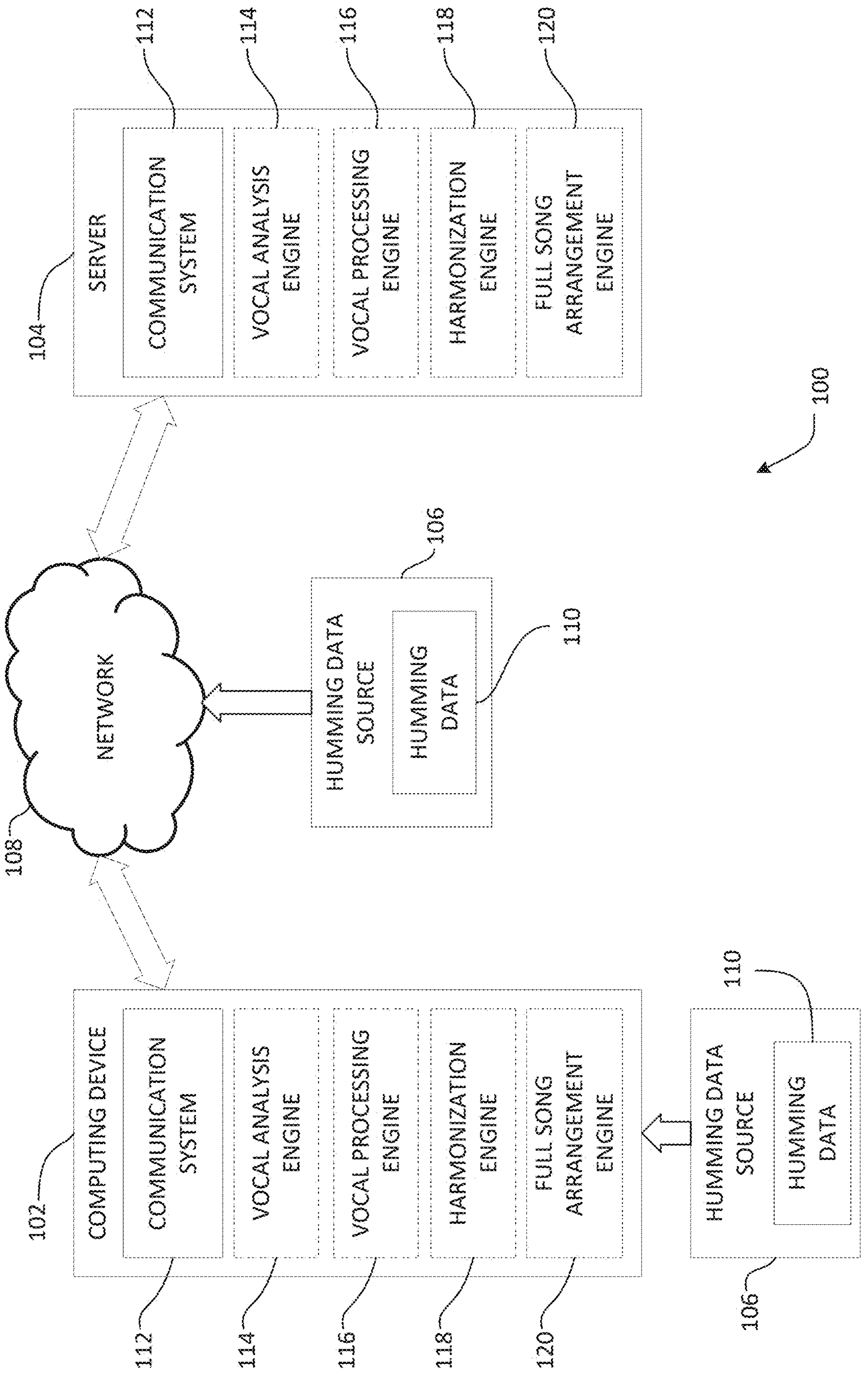
FIG. 1 illustrates an overview of an example system for converting audio samples to full song arrangements according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As used herein, the term "humming" refers to an audio sample. The audio sample may include words or lyrics. Additionally, or alternatively, the audio sample may include no words or lyrics. The audio sample may include harmonic content. Additionally, or alternatively, the audio sample may include one or more pitches that can be quantified into a melody, and thereby made into music, using mechanisms disclosed herein.

As mentioned above, vocal to song generators are automated systems that take improvised vocal input and create fully productionized songs. Automated song generation from user vocal input is important to lower the music creation barrier. For example, automated song generation mechanisms can allow individuals who lack the resources of professional musical artists or musicians to create songs of their own.

However, conventional automated song generation mechanisms (e.g., systems and/or methods) may require structure vocal input (e.g., a reference beat and/or a reference key). Further, conventional automated song generation systems and methods may be unable to generate full accompaniments to songs including, for example, harmonization, arpeggiation, percussion, etc.

Accordingly, aspects of the present disclosure relate to methods and systems for converting audio samples to full song arrangements. Generally, mechanisms disclosed herein allow a user to provide an audio sample (e.g., an improvised vocal singing excerpt, such as humming), without referring to any reference keys, rhythms, or existing songs. Mechanisms disclosed herein process the user's audio sample to convert it into a computer readable melody excerpt. Mechanisms disclosed herein analyze and melody excerpt and automatically generate chord sequences for the melody excerpt based on, for example, machine learning models and music rules. Mechanisms disclosed herein may then further generate a multi-instrument accompaniment and mix the multi-instrument accompaniment with the processed audio sample to render a full song arrangement.

Advantages of mechanisms disclosed herein may include the ability to generate a full song arrangement from an audio sample, without reference to any specific key, rhythm, or song. Additionally, or alternatively, advantages of mechanisms disclosed herein may include the ability to generate a full song arrangement with musical accompaniments based on novel harmonization techniques. Further advantages may be apparent to those of ordinary skill in the art, at least in light of the non-limiting examples described herein.

FIG. 1 shows an example of a system 100 for converting audio samples to full song arrangements, in accordance with some aspects of the disclosed subject matter. The system 100 includes one or more computing devices 102, one or more servers 104, a humming or audio data source 106, and a communication network or network 108. The computing device 102 can receive humming or audio data 110 from the audio data source 106, which may be, for example a person who is humming into a microphone or transducer, a computer-executed program that generates humming data, and/or memory with data stored therein that corresponds to humming data. Additionally, or alternatively, the network 108 can receive humming data 110 from the humming data source 106, which may be, for example a person who is humming themselves, a computer-executed program that generates humming data, and/or memory with data stored therein that corresponds to humming data.

Computing device 102 may include a communication system 112, a vocal analysis engine or component 114, a vocal processing engine or component 116, a harmonization engine or component 118, and a full song arrangement engine or component 120. In some examples, computing device 102 can execute at least a portion of vocal analysis component 114 to generate a melodic transcription corresponds to audio data (e.g., audio data 110). Further, in some example, computing device 102 can execute at least a portion of vocal processing component 116 to autotune or warp audio data. Further, in some examples, computing device 102 can execute at least a portion of harmonization component 118 to generate chord progressions corresponding to a melodic transcription (e.g., as generated by vocal analysis component 114). Further, in some examples, computing device 102 can execute at least a portion of full song arrangement component 120 to generate an instrumental accompaniment to chord progressions (e.g., as generated by the harmonization component 118).

Server 104 may include a communication system 112, a vocal analysis engine or component 114, a vocal processing engine or component 116, a harmonization engine or component 118, and a full song arrangement engine or component 120. In some examples, server 104 can execute at least a portion of vocal analysis component 114 to generate a melodic transcription corresponds to audio data (e.g., audio data 110). Further, in some example, server 104 can execute at least a portion of vocal processing component 116 to autotune or warp audio data. Further, in some examples, server 104 can execute at least a portion of harmonization component 118 to generate chord progressions corresponding to a melodic transcription (e.g., as generated by vocal analysis component 114). Further, in some examples, server 104 can execute at least a portion of full song arrangement component 120 to generate an instrumental accompaniment to chord progressions (e.g., as generated by the harmonization component 118).

Additionally, or alternatively, in some examples, computing device 102 can communicate data received from humming data source 106 to the server 104 over a communication network 108, which can execute at least a portion of vocal analysis component 114, vocal processing component 116, harmonization component 118, and/or full song arrangement component 120. In some examples, vocal analysis component 114 may execute one or more portions of method/process 700, described below in connection with FIG. 7. Further, in some examples, vocal processing component 116 may execute one or more portions of method/process 700, described below in connection with FIG. 7. Further, in some examples, harmonization component 118 may execute one or more portions of method/process 700, described below in connection with FIG. 7. Further, in some examples, full song arrangement component 120 may execute one or more portions of method/process 700, described below in connection with FIG. 7.

In some examples, computing device 102 and/or server 104 can be any suitable computing device or combination of devices that may be used by a requestor, such as a desktop computer, a laptop computer, a smartphone, a tablet computer, a wearable computer, a server computer, a virtual machine being executed by a physical computing device, a web server, etc. Further, in some examples, there may be a plurality of computing device 102 and/or a plurality of servers 104.

In some examples, humming data source 106 can be any suitable source of humming data (e.g., audio samples generated from a computing device, audio samples recorded by a user, audio samples obtained from a database owned by a user, and/or audio samples obtained from a third-party database that is capable of sharing audio samples, with a user's permission, such as a database of a social media application, messaging application, email application, etc.) In a more particular example, humming data source 106 can include memory storing humming data (e.g., local memory of computing device 102, local memory of server 104, cloud storage, portable memory connected to computing device 102, portable memory connected to server 104, etc.).

In another more particular example, humming data source 106 can include an application configured to generate humming data. In some examples, humming data source 106 can be local to computing device 102. Additionally, or alternatively, humming data source 106 can be remote from computing device 102 and can communicate humming data 110 to computing device 102 (and/or server 104) via a communication network (e.g., communication network 108).

In some examples, communication network 108 can be any suitable communication network or combination of communication networks. For example, communication network 108 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 108 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
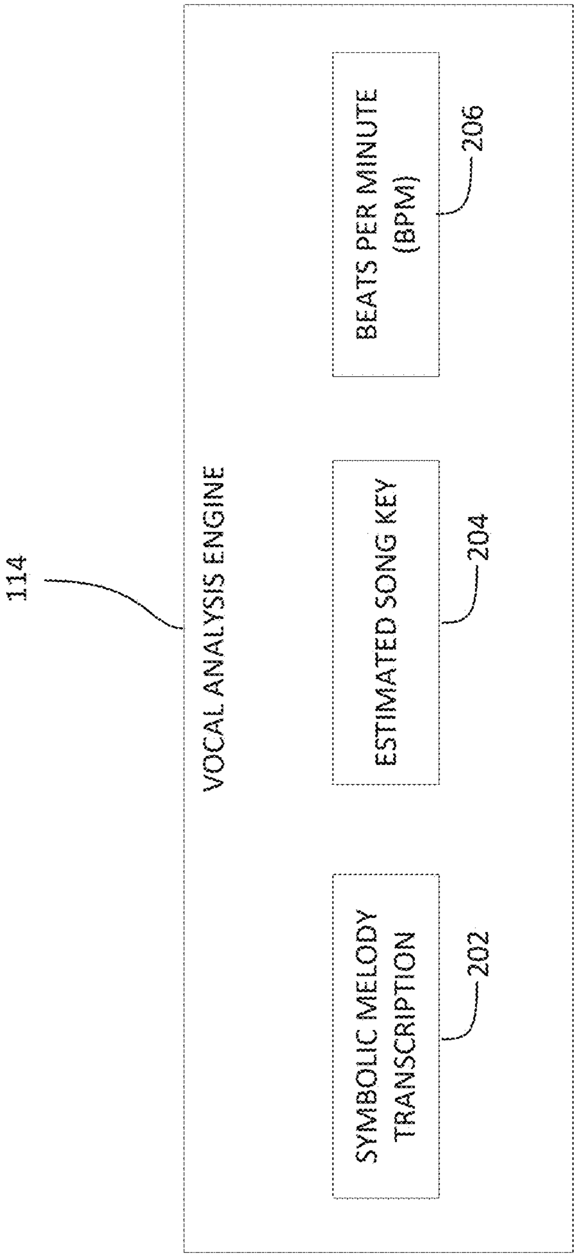
FIG. 2 illustrates a detailed schematic of a portion of the example system of FIG. 1 according to aspects described herein.

FIG. 2 illustrates a detailed schematic of the vocal analysis component or engine 114 of the example system 100 for converting audio samples to full song arrangements. The vocal analysis component 114 includes a plurality of components or engines that implement various aspects of the vocal analysis component 114. For example, the vocal analysis component can include a symbolic melody transcription component 202, an estimated song key component 204, and/or a beat per minute (BPM) component 206. The plurality of components of the vocal analysis component 116 may store information that is parsed and/or determined from audio sample data (e.g., humming data 110).

The symbolic melody transcription component 202 may contain (e.g., stored in a memory location corresponding to the symbolic transcription component 202), and/or generate an indication of a symbolic melody transcription based on audio sample data (e.g., humming data 110). For example, the symbolic melody transcription component 202 may estimate note pitches and/or onsets of vocals, such as, for example, using conventional methods of note pitch estimation and/or detection of onsets of vocals that may be recognized by those of ordinary skill in the art. Further, if vocals are out of tune, the symbolic melody transcription component 202 may tune pitch to best fit A440 pitch standards. An indication of the tuned pitches may then be stored (e.g., in memory). Further, the symbolic melody transcription may be in a musical instrument digital interface (MIDI) format. The MIDI format may be generated by the symbolic melody transcription component 202.

The estimated song key component 204 may contain (e.g., stored in a memory location corresponding to the song key component 204), and/or generate an indication of an estimated song key based on audio sample data (e.g., humming data 110). For example, the song key may correspond to one or more pitches, such as, for example, pitches that may be autotuned by the symbolic melody transcription component 202.

The beats per minute (BPM) component 206 may contain (e.g., stored in a memory location corresponding to the BPM component 206), and/or generate an indication of an estimated BPM based on audio sample data (e.g., humming data 110). For example, the BPM may be determined based on note onsets and offsets. Additionally, or alternatively, the BPM may be insert by a user (e.g., via a user-interface, such as a web-based user-interface).

Generally, the vocal analysis component 114 transcribes audio sample data (e.g., humming data 110) to a symbolic melody transcription in MIDI format. Notes of the symbolic melody transcription may be autotuned to diatonic scale based on an estimated key (e.g., determined by, or stored in, song key component 204) and quantized based on a detected BPM (e.g., determined by, or stored in, BPM component 206).

Figure 3:
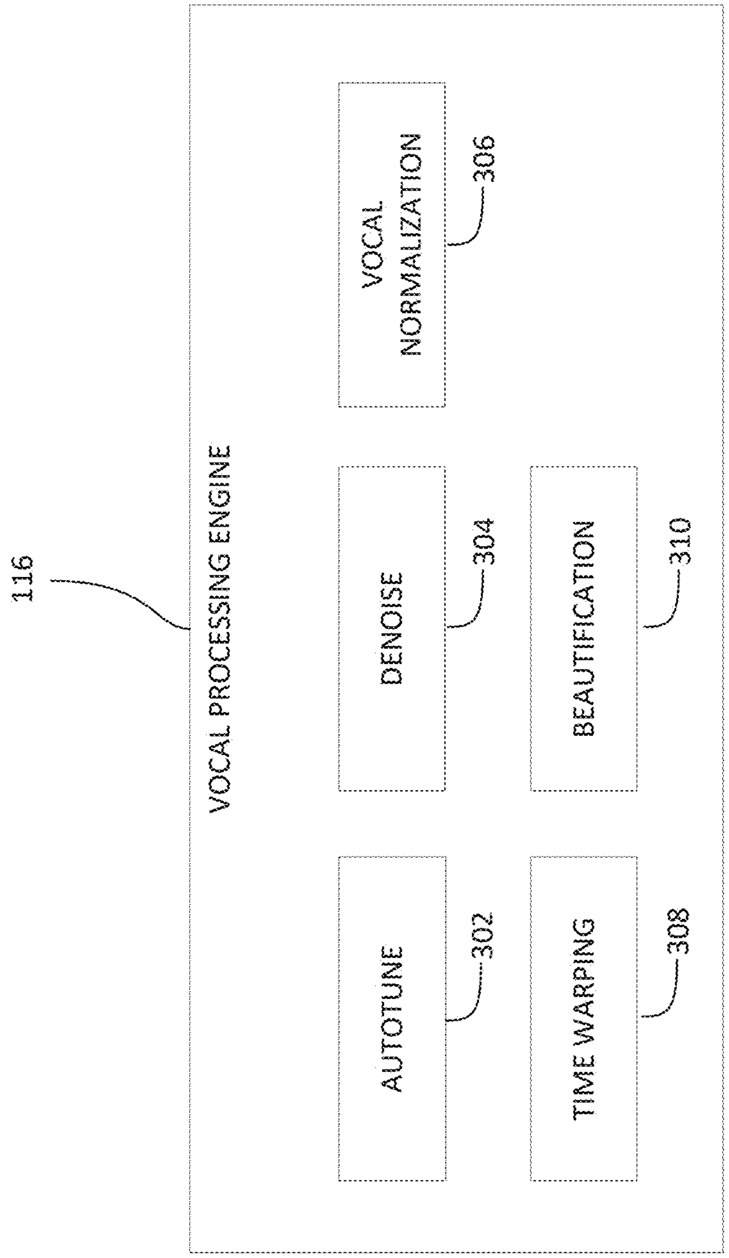
FIG. 3 illustrates a detailed schematic of a portion of the example system of FIG. 1 according to aspects described herein.

FIG. 3 illustrates a detailed schematic of the vocal processing component or engine 116 of the example system 100 for converting audio samples to full song arrangements. The vocal processing component 116 includes a plurality of components or engines that implement various aspects of the vocal processing component 116. For example, the vocal processing component 116 can include an autotune component 302, a denoise component 304, a vocal normalization component 306, a time warping component 308, and/or a beautification component 310. The plurality of components of the vocal processing component 116 may store information that is parsed and/or determined from audio sample data (e.g., humming data 110).

The autotune component 302 may contain (e.g., stored in a memory location corresponding to the autotune component 302) computer readable instructions that, when executed by a processor, cause audio sample data (e.g., humming data 110) to be autotuned. For example, the vocal analysis engine 114 may determine an autotuned melody transcription. Accordingly, the autotune component 302 may shift vocals of the audio sample data to align with the determined autotuned melody transcription.

The denoise component 304 may contain (e.g., stored in a memory location corresponding to the denoise component 304) computer readable instructions that, when executed by a processor, cause audio sample data (e.g., humming data 110) to be denoised. For example, mechanisms disclosed herein may identify a subset of the audio sample data corresponding to ambient or background noise. The subset of the audio sample data may then be removed (e.g., filtered out, such as, via digital signal processing) to denoise the audio sample data.

The vocal normalization component 306 may contain (e.g., stored in a memory location corresponding to the vocal normalization component 304) computer readable instructions that, when executed by a processor, cause audio sample data (e.g., humming data 110) to be normalized. For example, a volume of the audio sample data can be normalized via compression and/or loudness adjustments, performed by mechanisms disclosed herein.

The time warping component 308 may contain (e.g., stored in a memory location corresponding to the time warping component 308) computer readable instructions that, when executed by a processor, cause audio sample data (e.g., humming data 110) to be time warped. For example, audio sample data (e.g., humming data 110, and/or audio sample data that has been autotuned, using mechanisms disclosed herein) can be segmented, stretched, and warped to best fit note onsets. In some examples, the audio sample data can be time warped using dynamic time warping that is based on a BPM (e.g., a BPM detected or determined by the BPM component 206).

The beautification component 308 may contain (e.g., stored in a memory location corresponding to the beautification component 308) computer readable instructions that, when executed by a processor, cause audio sample data (e.g., humming data 110) to be beautified. For example, mechanisms disclosed herein may beautify audio sample data (e.g., humming data 110, and/or audio sample data that has been autotuned, using mechanisms disclosed herein) by applying one or more vocal effects from the group of: compressor adjustment, reverb adjustment, and chorus adjustment. Additional, and/or alternative vocal effects may be recognized by those of ordinary skill in the art to beautify audio sample data.

Generally, some examples in accordance with the present disclosure may receive freeform vocal inputs (e.g., audio sample data) that is out of key, off-beat, and/or recorded with a noisy environment. Mechanisms disclosed herein, with respect to the vocal processing component 116 (e.g., the autotune component 302, the denoise component 304, the vocal normalization component 306, the time warping component 308, and/or the beautification component 310) allow for freeform vocal inputs to be processed to improve performance of generating a high-quality full song arrangement, as described further herein.

Figure 4:
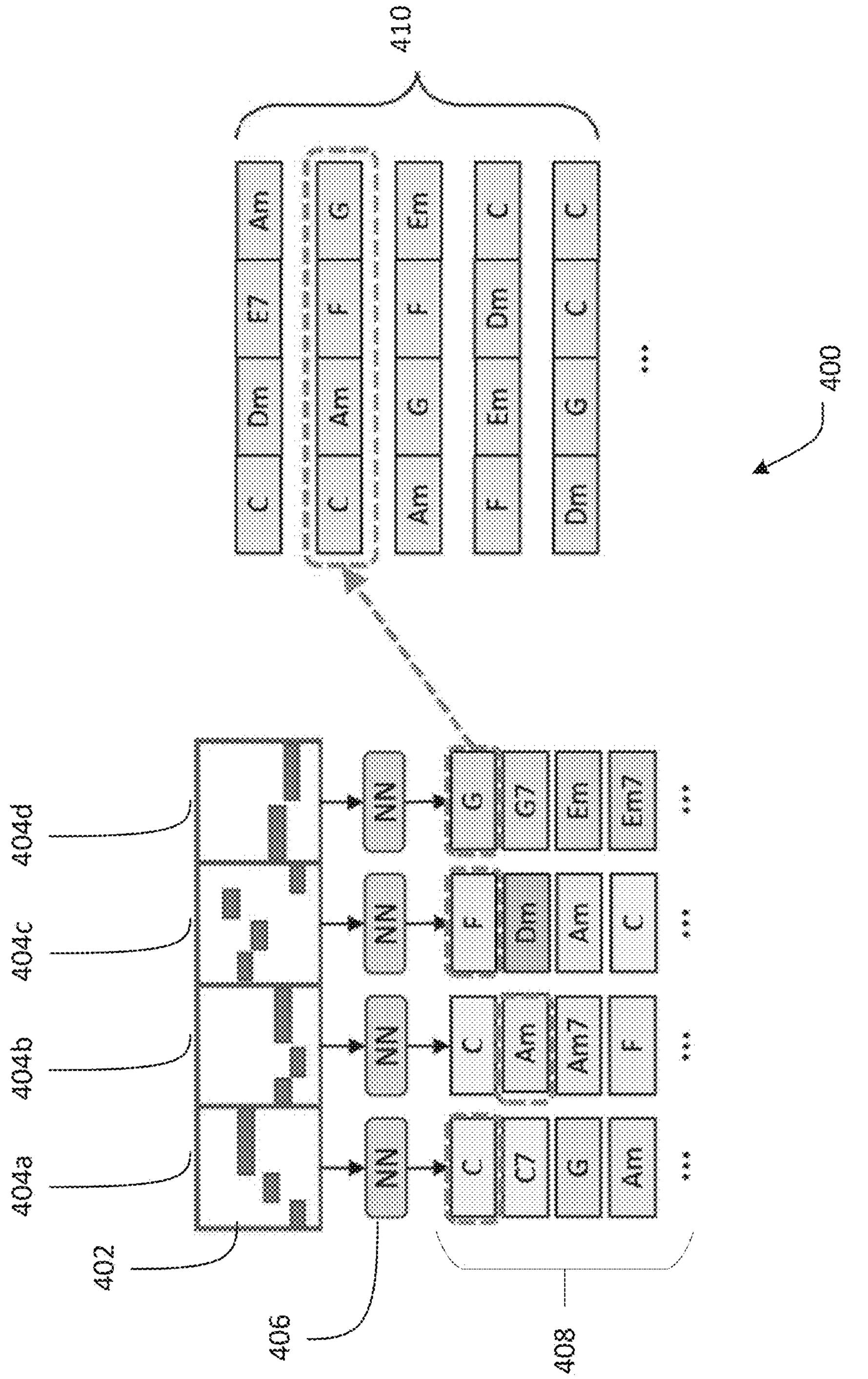
FIG. 4 illustrates an example implementation of a portion of the example system of FIG. 1 according to aspects described herein.

FIG. 4 illustrates an example harmonization flow 400, according to aspects described herein. Generally, the harmonization flow 400 may include a machine-learning component and a musical rule component, as discussed further herein.

The harmonization flow 400 includes receiving a melody 402 that includes one or more bars, such as a first bar 404*a*, a second bar 404*b*, a third bar 404*c*, and a fourth bar 404*d*). Each of the one or more bars 404 are input into a corresponding machine learning model 406. For example, each of the machine learning models 406 may be neural networks (NN). One or more predicted chords 408 are output from each of the machine learning models 406, based on the corresponding one or more bars 404 that are input into the machine learning model 406.

The one or more predicted chords 408 may be a plurality of chords that are ranked. For example, the plurality of chords 408 may be ranked by a probability of how well each of the plurality of chords 408 match a corresponding one of the one or more bars 404. For example, a first chord (e.g., of the chords 408) that most probably matches the corresponding bar 404 (e.g., such as may be determined using a confidence value) may be ranked first, and a second chord (e.g., of the chords 408) that least probably matches the corresponding bar 404 (e.g., such as may be determined using a confidence value) may be ranked last, or vice-versa.

The machine learning models 406 (e.g., neural network models) may be trained on a data set of paired melody bars and chords. In some examples, the data set includes over 500,000 bars of melody-chord pairs. Further, the chords in the data set can include maj, min, 7, min7, min7b5, aug, and/or sus4. Additional and/or alternative chords may be included, as may be recognized by those of ordinary skill in the art.

A plurality of chord progressions 410 may be pre-determined by a user based on musical rules and/or popularity of chord progressions. One or more of the chord progressions 410 may correspond to the one or more predicted chords 408 that are determined for the melody 402. As an example of a musical rule, and as illustrated in FIG. 4, a user may not desire for two C chords to be next to each other. Accordingly, when a plurality of chords are predicted, of which two are C chords that are adjacent to each other (e.g., C-C-F-G), a corresponding chord progression of the chord progressions 410 may be the best-match (i.e., the most chords in the progression match with the predicted chords), such as, for example, C-Am-F-G. Other musical rules based on popularity of chord progressions and/or standards within a music industry may be recognized by those of ordinary skill in the art.

For each 4-bar segment (e.g., 404*a-d*) of the melody 402, the flow 400 may traverse the plurality of chord progressions 410 that are predetermined, and select one of the plurality of chord progressions 410 that best matches the generated chords 408 corresponding to the 4-bar segment of the melody 402. Additionally, and/or alternatively, the flow 400 may traverse the plurality of chord progressions 410, and select one of the plurality of chord progressions 410 with the most popular chord progression. In such examples, the selected chord progression from the plurality of chord progressions 410 may not be the best match for the generated chord candidates (e.g., as based on matching chords); however, information regarding popularity of chord progression may make a first chord progression more desirable for generating a high-quality full song arrangement, than a second chord progression that is less popular.

Figure 5:
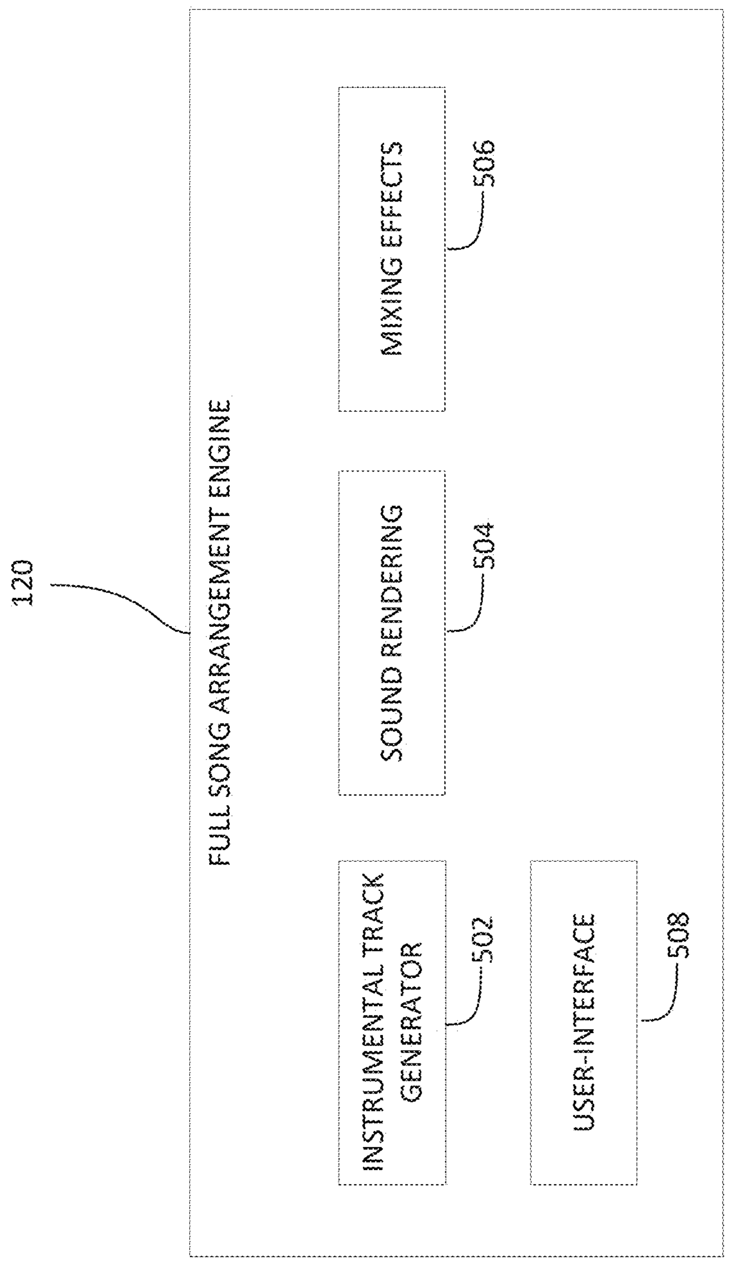
FIG. 5 illustrates a detailed schematic of a portion of the example system of FIG. 1 according to aspects described herein.

FIG. 5 illustrates a detailed schematic of the full song arrangement component or engine 120 of the example system 100 for converting audio samples to full song arrangements. The full song arrangement component 120 includes a plurality of components or engines that implement various aspects of the full song arrangement component 120. For example, the full song arrangement component 120 can include an instrumental track generator component 502, a sound rendering component 504, a mixing effects component 506, and/or a user-interface component 508. The plurality of components of the full song arrangement component 120 may store information that is parsed and/or determined from audio sample data (e.g., humming data 110).

The instrumental track generator component 502 may contain (e.g., stored in a memory location corresponding to the track generator component 502) computer readable instructions that, when executed by a processor, cause an instrumental track to be generated. For example, the instrumental track generator component 502 may generate an instrumental track in symbolic representation (e.g., MIDI format) based on generated chord sequences, such chord sequences that are generated based on mechanisms described earlier herein, with respect to FIG. 4. In some examples, the instrumental track may include one or more instruments. In other examples, the instrumental track may include a plurality of instruments. For example, the instrumental track may include vocals, drums, bass, plano, strings, wind instruments, and/or any other instruments that may be recognized by those of ordinary skill in the art to accompany a full song arrangement.

The sound rendering component 504 may contain (e.g., stored in a memory location corresponding to the sound rendering component 504) computer readable instructions that, when executed by a processor, cause sound to be rendered. For example, the sound rendering component 504 may cause an instrumental track in symbolic representation (e.g., as generated by instrumental track generator component 502) to be synthesized into audio format. Accordingly, the sound rendering component 504 may receive, as input, an output or indication thereof of the instrumental track generator component 502.

The mixing effects component 506 may contain (e.g., stored in a memory location corresponding to the mixing effects component 506) computer readable instructions that, when executed by a processor, cause mixing effects to be applied to an instrumental track. The mixing effects may be selected or pre-determined from a plurality of musical styles. For example, the mixing effects may include one or more of acoustic style, pop style, rap style, electronic, hip pop, and/or any other musical style with a corresponding mixing effect that may be applied to an instrumental track. The mixing effects component 506 can allow for a balanced, high-quality mixing of processed vocal humming and generated instrumental tracks to be performed.

The user-interface component 508 may contain (e.g., stored in a memory location corresponding to the user-interface component 508) computer readable instructions that, when executed by a processor, cause a user-interface to be generated and/or cause one or more inputs corresponding to a user-interface to be received. For example, the user-interface may be a user-interface of a web application. Alternatively, the user-interface may be a user-interface of a mobile application. Further, a user may have the ability to select one or more options on the user-interface (e.g., via a mouse, keyboard, touchscreen, trackpad, etc.). For example, a user may have the ability to select a type of style with which an instrumental track is generated (e.g., acoustic, pop, rap, electronic, hip pop, etc.). Additionally, or alternatively, a user may have the ability to enter a desired beats per minute (BPM) of an instrumental track, such that mechanisms described herein perform vocal processing (e.g., time warping) corresponding to the input of the user, as determined by the user-interface component 508.

Figure 6:
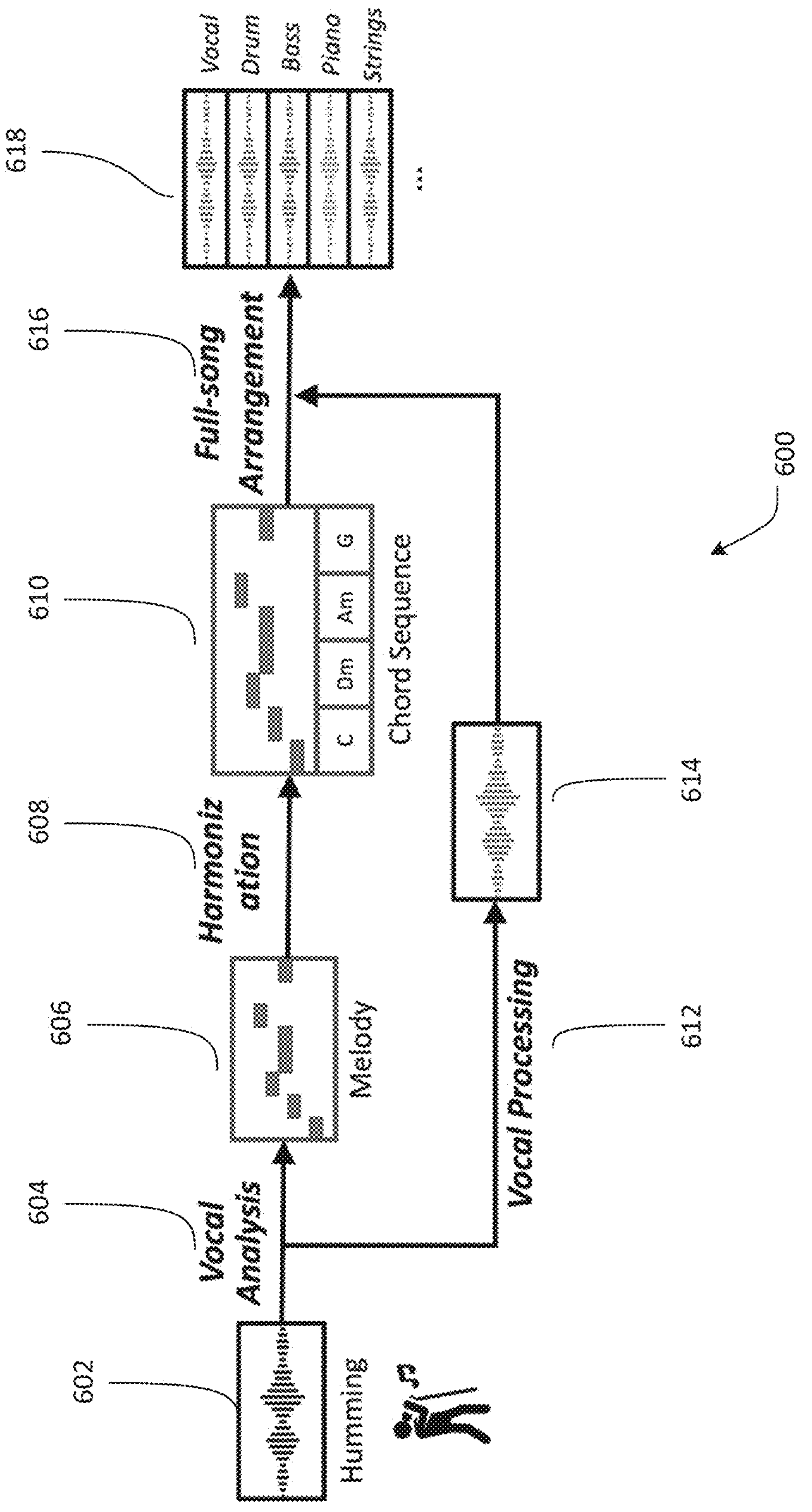
FIG. 6 illustrates an example flow of converting audio samples to full song arrangements according to aspects described herein.

FIG. 6 illustrates an example flow 600 of converting audio samples to full song arrangements according to aspects described herein. In examples, aspects of flow 600 are performed by a device, such as computing device 102 and/or server 104, discussed above with respect to FIG. 1.

Flow 600 begins with audio sample data or humming data 602 being received. The audio sample data 602 may be similar to the audio sample data 610 discussed earlier herein with respect to FIG. 1. Vocal analysis 604 may be performed on the audio sample data 610. In some examples, one or more aspects of the vocal analysis 604 may be performed by a vocal analysis component or engine (e.g., vocal analysis component 114). A melody 606 may be generated and/or determined by the vocal analysis 604. For example, the melody 606 may be similar to the melody generated by the symbolic melody transcription component 202 discussed earlier herein with respect to FIG. 2.

Harmonization 608 may be performed on the melody 606. In some examples, one or more aspects of the harmonization 608 are performed by a harmonization component or engine 118. The harmonization 608 may be similar to the example harmonization flow 400 discussed earlier herein with respect to FIG. 4. One or more chord sequences 610 may be generated and/or determined by the harmonization 608. The one or more chord sequences 610 may be similar to the chord sequences 410 described earlier herein with respect to FIG. 4.

Vocal processing 612 may be performed on the audio sample data 602, after vocal analysis 604 is performed thereon. In some examples, one or more aspects of the vocal processing 612 may be performed by a vocal processing component or engine (e.g., vocal processing component 116). The vocal processing 612 may include autotuning, denoising, vocal normalization, time warping, and/or beautification. Additional and/or alternative vocal processing techniques may be recognized by those of ordinary skill in the art and incorporated with mechanisms disclosed herein. Vocally processed audio sample data 614 may be output by the vocal processing 612 (e.g., audio sample data that has been autotuned, denoised, normalized, time warped, beautified, etc.).

Full song arrangement generation 616 may be performed based on the one or more chord sequences 610 and the vocally processed audio sample data 614. In some examples, one or more aspects of the full song arrangement generation 616 may be performed by a full-song arrangement component or engine (e.g., full song arrangement component 120). The full song arrangement generation 616 can include generating an instrumental track, rendering sound, applying mixing effects, and/or generating a user-interface. Additionally and/or alternative techniques for generating a full song arrangement may be recognized by those of ordinary skill in the art and incorporated with mechanisms disclosed herein. A full song arrangement 618 may be output by the full song arrangement generation 616. The full song arrangement may include vocals, drums, bass, plano, strings, and/or additional instrumentation that may be recognized by those of ordinary skill in the art. Further, the full song arrangement may have a style (e.g., pop, rap, rock, hip pop, blues, jazz, electronic, etc.).

Figure 7:
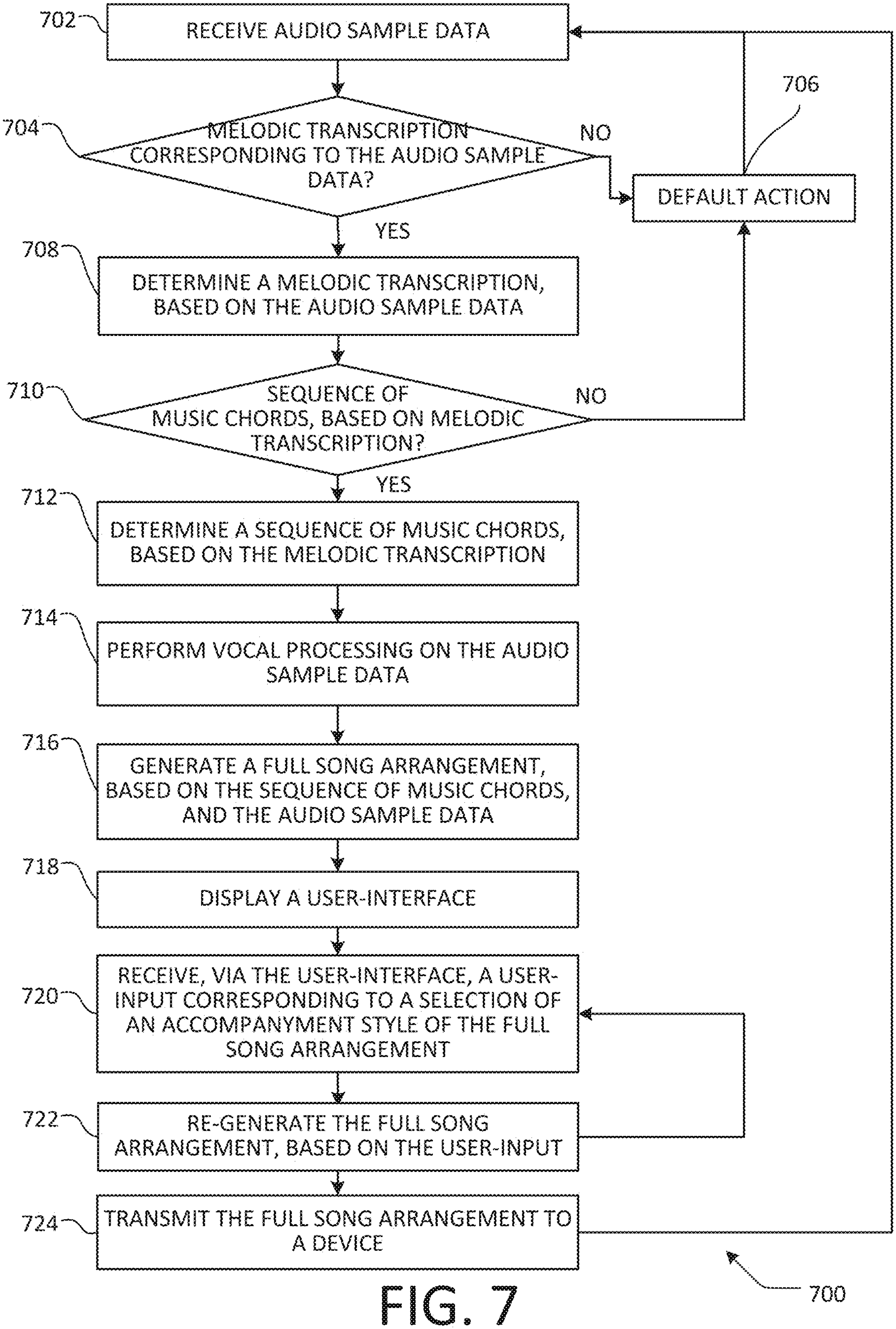
FIG. 7 illustrates an example method of converting audio samples to full song arrangements according to aspects described herein.

FIG. 7 illustrates an example method 700 of converting audio samples to full song arrangements according to aspects described herein. In examples, aspects of method 700 are performed by a device, such as computing device 102 and/or server 104, discussed above with respect to FIG. 1.

Method 700 begins at operation 702, where audio sample data is received. The audio sample data may be similar to audio sample data 110 discussed earlier herein with respect to FIG. 1. For example, the audio sample data may be received from a user who is improvising humming or singing without a reference key or rhythm provided by a system (e.g., free form). Additionally, or alternatively, the audio sample data may be generated by a computer-executed program that generates humming data. The audio sample data may include a plurality of subsets of data. For example, the audio sample data may include a first subset of data that corresponds to auditory words. Additionally, or alternatively, the audio sample data may include a second subset of data that corresponds to ambient or background noise. The audio sample data may be received via a computing device. Alternatively, the audio sample data may be received via a server (e.g., a web server).

At determination 704 it is determined if a melodic transcription corresponds to the audio sample data of operation 702. For example, if the audio sample data contains pitch with an accompanying harmony, then it may have a corresponding melodic transcription. However, if the audio sample data is a monophonic instrument, then a corresponding melodic transcription may not exist. Alternatively, in some examples, if the audio sample data includes at least some pitched content, then a corresponding melodic transcription may exist (e.g., regardless of if the audio sample data is monophonic or includes accompanying harmony). Therefore, in some examples, the audio sample data may be monophonic singing, monophonic instruments, or humming (e.g., as defined earlier herein), and still include a melodic transcription.

If it is determined that there is not a melodic transcription that corresponds to the audio sample data, flow branches "NO" to operation 706, where a default action is performed. For example, the audio sample data may have an associated pre-configured action. In other examples, method 700 may comprise determining whether the audio sample data has an associated default action, such that, in some instances, no action may be performed as a result of the received audio sample data. Method 700 may terminate at operation 706. Alternatively, method 700 may return to operation 702 to provide an iterative loop of receiving audio sample data and determining whether or not a corresponding melodic transcription exists.

If however, it is determined that the audio sample data does have a corresponding melodic transcription, flow instead branches "YES" to operation 708, wherein the melodic transcription is determined, based on the audio sample data. For example, a symbolic melody transcription component (e.g., symbolic melody transcription component 202) may estimate note pitches and/or onsets of vocals to determine a melody transcription. Further, the melody transcription may be in a musical instrument digital interface (MIDI) format that is generated using mechanisms disclosed herein.

At determination 710 it is determined if a sequence of music chords exist based on the melodic transcription. For example, it may be determined if a sequence of music chords can be generated, based on the melodic transcription. In some examples, it may be assumed that a sequence of music chords can be generated, based on the melodic transcription, such that flow branches "YES" past determination 710. The melodic transcription may include a plurality of bars (e.g., 4-bars). Further, a trained machine learning model (e.g., a neural network) may determine chord candidates for each bar of the melodic transcription.

If it is determined that there is not a sequence of music chords based on the melodic transcription (e.g., a sequence of music chords cannot be generated based on the melodic transcription), flow branches "NO" to operation 706, where a default action is performed. For example, the melodic transcription may have an associated pre-configured action. In other examples, method 700 may comprise determining whether the melodic transcription has an associated default action, such that, in some instances, no action may be performed as a result of the received audio sample data. Method 700 may terminate at operation 706. Alternatively, method 700 may return to operation 702 to provide an iterative loop of receiving audio sample data and determining whether or not a sequence of music chords exist, based on a melodic transcription.

If however, it is determined that there are a sequence of music chords based on the melodic transcription (e.g., a sequence of music chords can be generated based on the melodic transcription, or it is assumed that the sequence of music chords can be generated), flow instead branches "YES" to operation 712, wherein the sequence of music chords are determined, based on the melodic transcription. For example, the determining of the sequence of music chords may include determining, using a trained machine learning model, chord candidates, for each bar of the melodic transcription. Further, the determining of the sequence of music chords may include determining, using pre-defined chord progressions, one or more chord progressions corresponding to the determined chord candidates. Such examples are discussed in further detail earlier herein with respect to the example harmonization flow 400 of FIG. 4.

The trained machine learning model may be a neural network that is trained based on a data set of paired melody bars and chords. Further, the chords in the data set may include maj, min, 7, min7, min7b5, and/or sus4. Additional, or alternative, chords may be recognized by those of ordinary skill in the art based on, for example, popularity in the music industry and/or desired sounds to be produced by a user.

At operation 714 vocal processing is performed on the audio sample data. In some examples, the vocal processing includes removing a subset of audio sample data corresponding to ambient or background noise. In some examples, the vocal processing further includes performing autotuning on the audio sample data, normalizing a volume of the audio sample data, and/or performing dynamic time warping on the audio sample data. Still further, in some examples, the vocal processing may include beautifying the audio sample data, by applying one or more vocal effects from the group of: compressor adjustment, reverb adjustment, and chorus adjustment.

At operation 716, a full song arrangement is generated based on the sequence of music chords and the audio sample data. In some examples, the full song arrangement is generated based on the sequence of music chords and the vocally processed audio sample data (e.g., the audio sample data of operation 702, after it is processed at operation 714). The full song arrangement may include an instrumental track and/or mixing effects. Further, the generating of the full song arrangement can include performing a sound rendering to synthesize an instrumental track into audio format (e.g., from symbolic representation).

At operation 718 a user-interface is displayed. In some examples the user-interface is displayed via a mobile-application. Additionally, or alternatively, in some examples, the user-interface is displayed via a web-application. The user-interface may include one or more input sections (e.g., selections, drop-down menus, text boxes, buttons, etc.) at which a user may provide user-input regarding one or more aspects of the full song arrangement.

At operation 720 a user-input corresponding to a selection of an accompaniment style of the full song arrangement is received, via the user-interface. The selection of the accompaniment style may be from one of a plurality of accompaniment styles. In some examples, the plurality of accompaniment styles may include a plurality of different musical genres from which a user may select (e.g., rap, rock, pop, hip pop, classical, acoustic, country, electronic, etc.). Further, in some examples, the plurality of accompaniment styles may include a plurality of different instruments from which a user may select (e.g., vocals, drum, bass, plano, strings, harp, flute, triangle, etc.).

At operation 722 the full song arrangement is re-generated based on the user-input received at operation 720. For example, the initial generation of the full song arrangement may include a first accompaniment style and the user-input may correspond to a second accompaniment style. Accordingly, the full song arrangement will be re-generated to include the second accompaniment style, instead of the first accompaniment style. In this respect, the user may re-mix the full song arrangement based on user-input, such as may be provided via a user-interface (e.g., the user interface displayed at operation 718). In some examples, The generation of the full song arrangement may be performed by digital signal processing. Therefore, the digital signal processing may be configured based on the user-input received at operation 720, such that the full song arrangement can be re-generated, based on the user-input.

At operation 724 the full song arrangement is transmitted to a device or computing device. In some examples, the full song arrangement may be generated on a server (e.g., server 104) that is in communication with a device or computing device (e.g., computing device 102), via a network (e.g., network 108). The full song arrangement may be generated on the server and transmitted to the device to be played on the device. For example, the full song arrangement may be stored in memory of the device, and memory storing instructions on the device may be executed (e.g., via a processor) to play the full song arrangement on the device, such as via an audio output of the device.

Method 700 may terminate at operation 724. Alternatively, method 700 may return to operation 702 to provide an iterative loop of receiving an indication of pending tasks and determining whether a follow-up communication from a requestor is appropriate.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
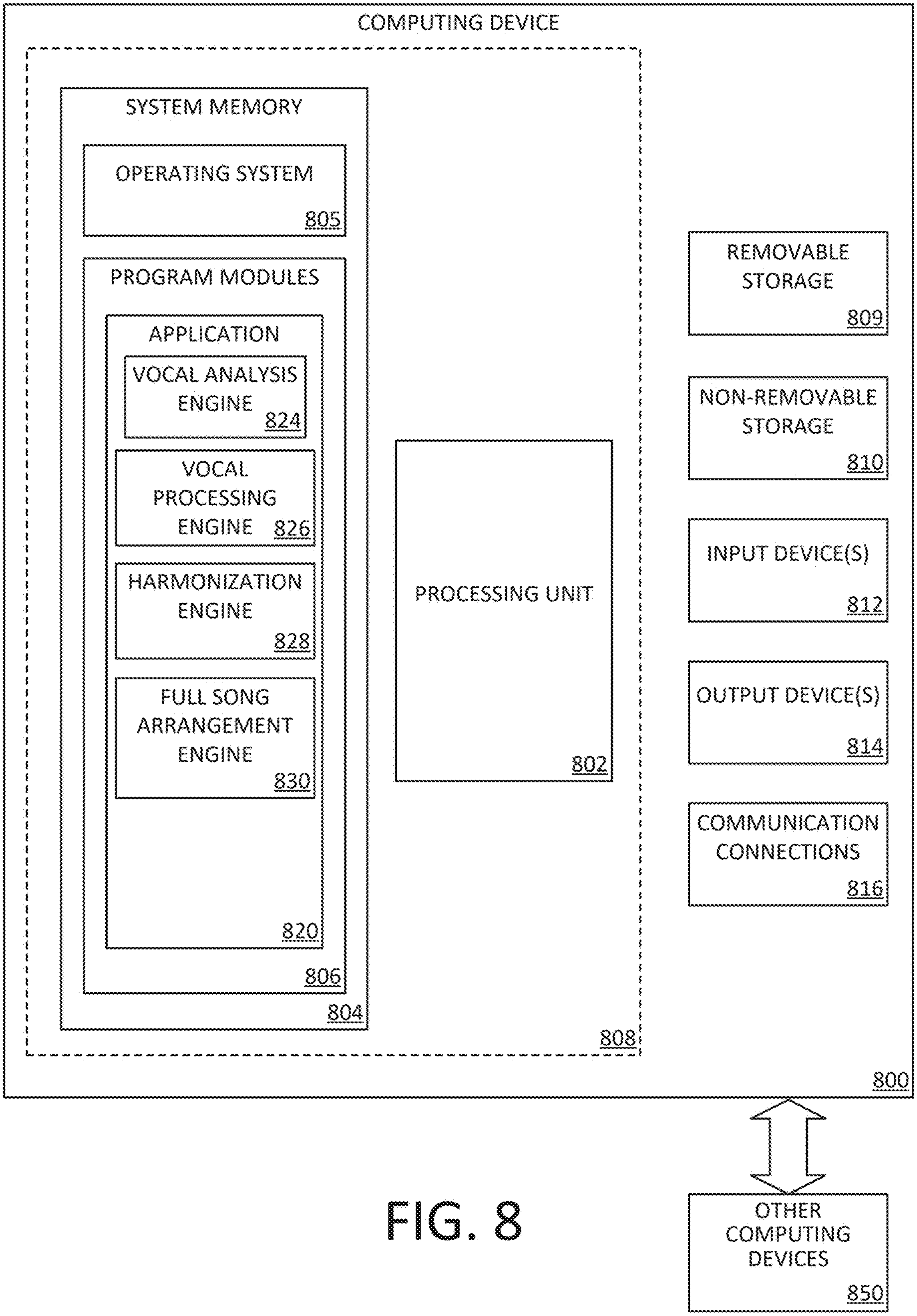
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including computing device 102 in FIG. 1. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software application 820, such as one or more components supported by the systems described herein. As examples, system memory 804 may store vocal analysis engine or component 824, vocal processing engine or component 826, harmonization engine or component 828, and full song arrangement engine or component 830. The operating system 805, for example, may be suitable for controlling the operation of the computing device 800.

Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
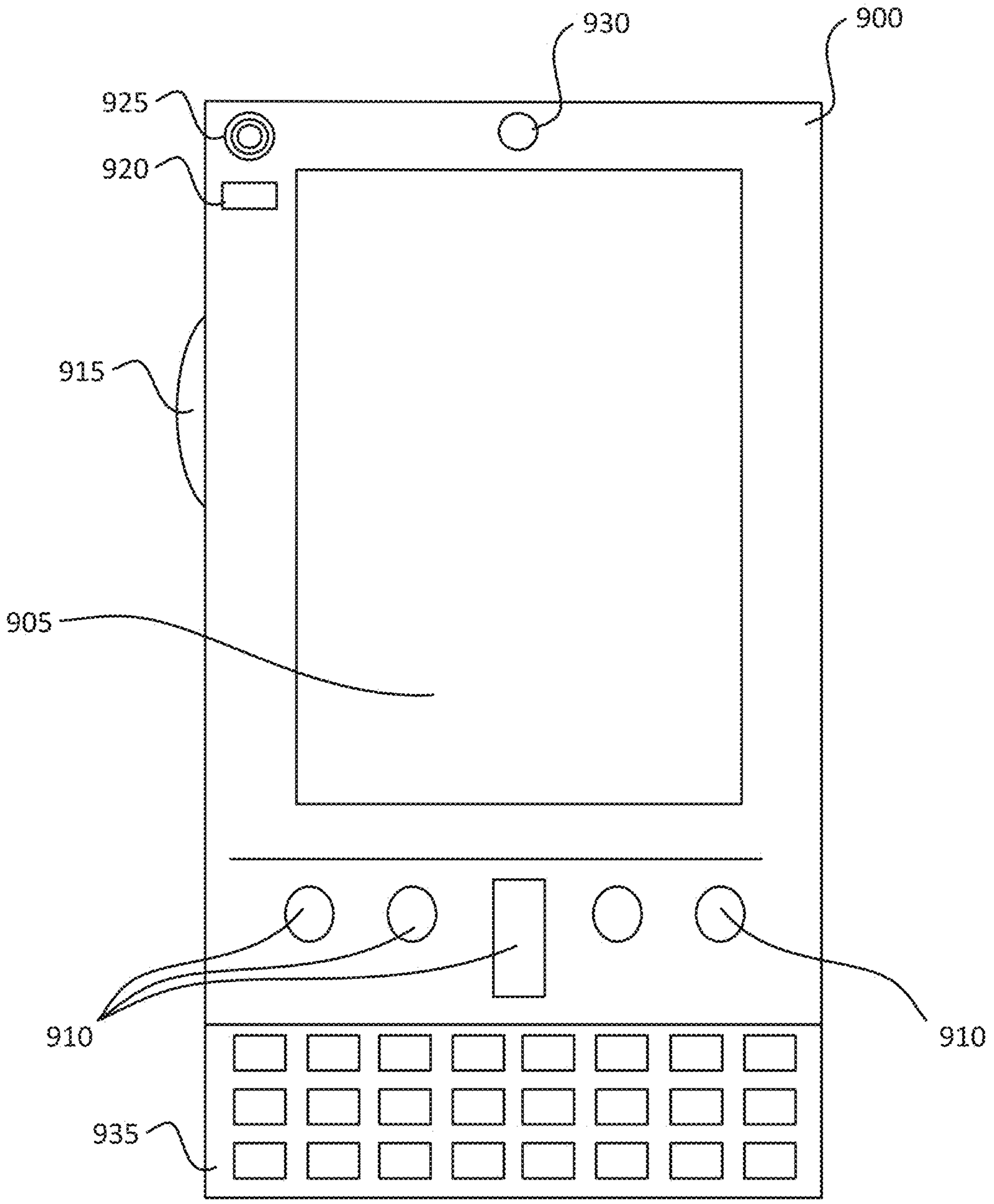
FIGS. 9A and 9B are simplified block diagrams of a mobile computing device with which aspects of the present disclosure may be practiced.
Figure 9B:
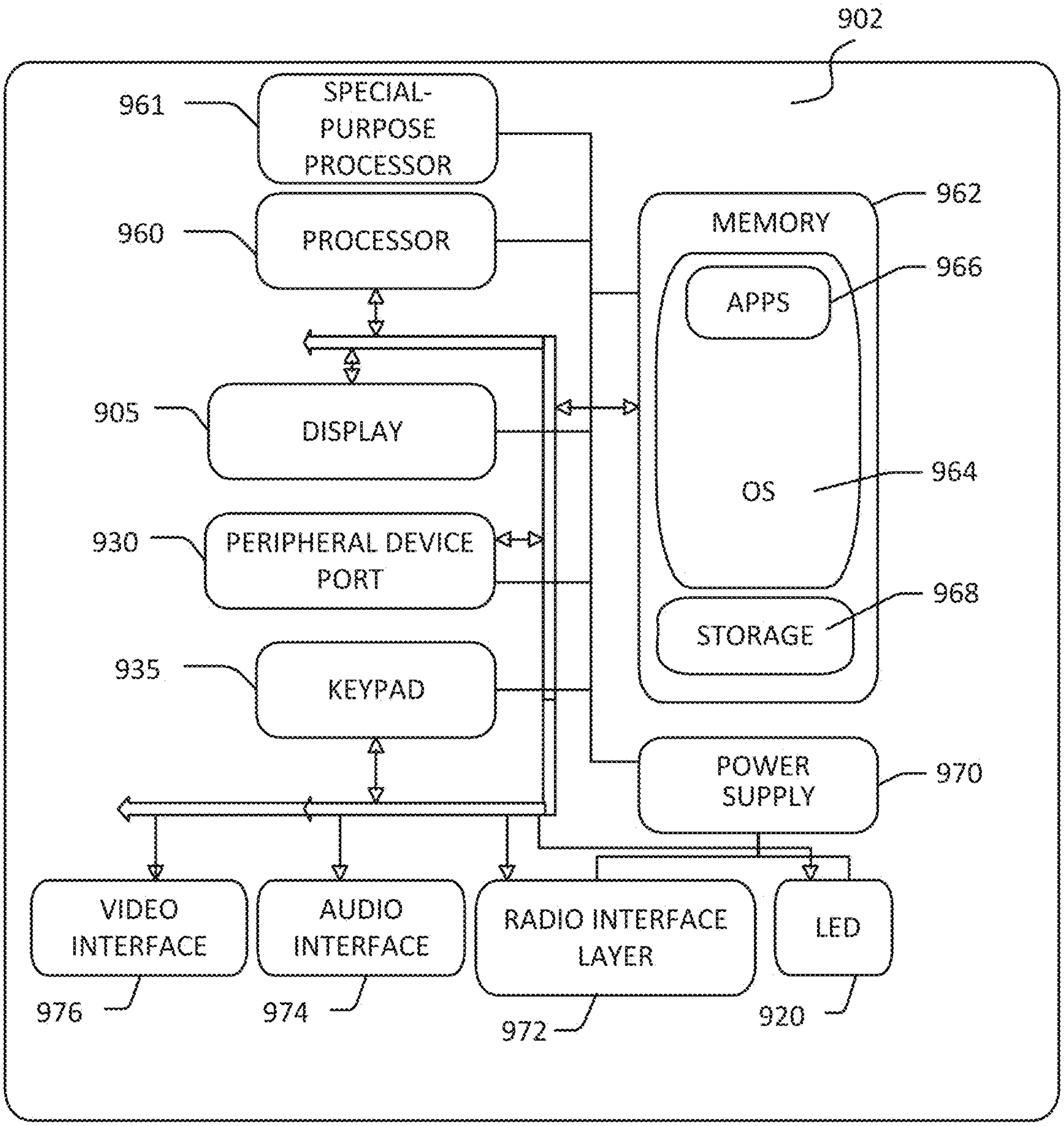

FIGS. 9A and 9B illustrate a mobile computing device 900, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display).

If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some examples.

In yet another alternative example, the mobile computing device 900 is a portable phone system, such as a cellular phone. The mobile computing device 900 may also include an optional keypad 935. Optional keypad 935 may be a physical keypad or a "soft" keypad generated on the touch screen display.

In various examples, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In some examples, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., a task management engine, communication generation engine, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and/or special-purpose processor 961 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
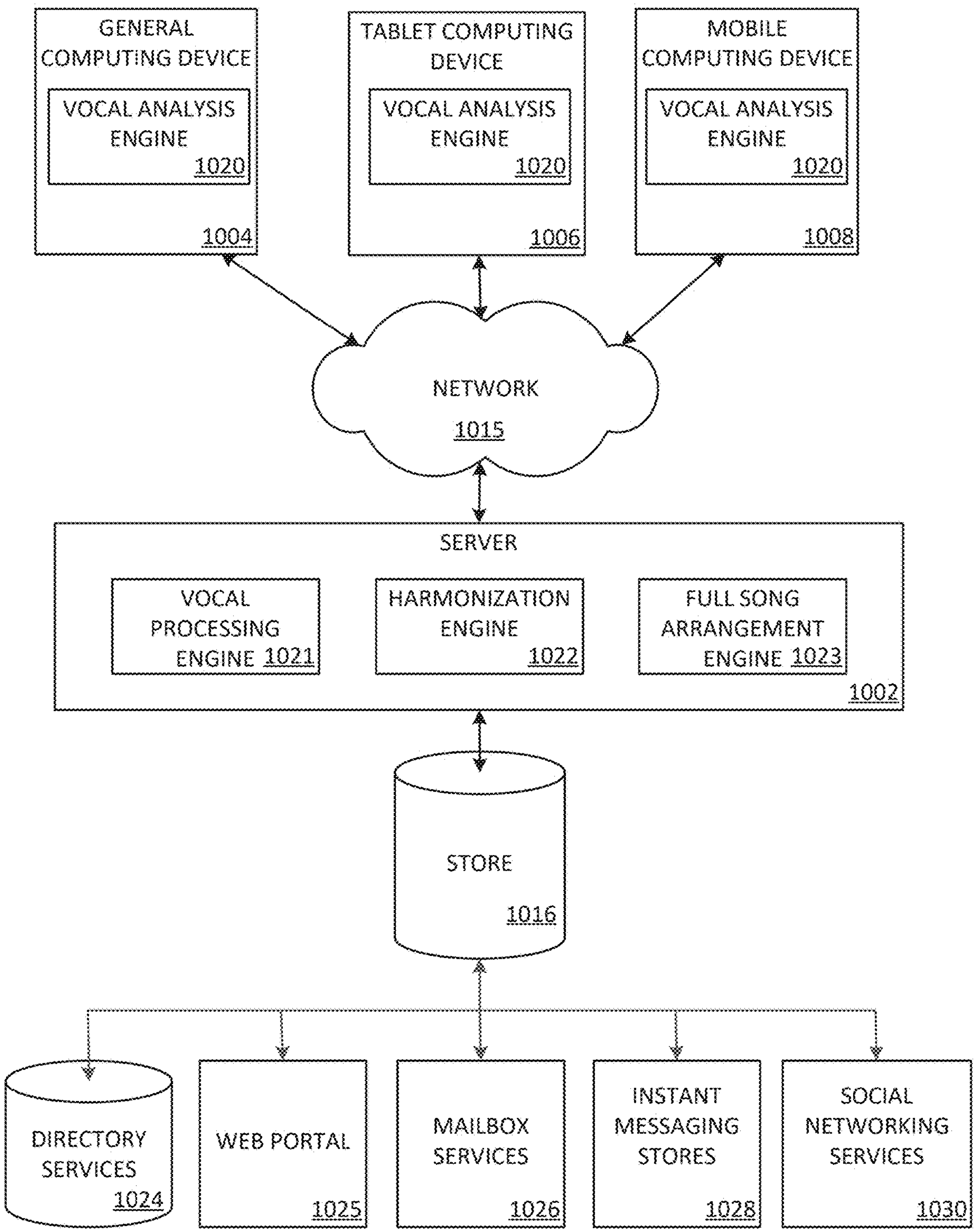
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1024, a web portal 1025, a mailbox service 1026, an instant messaging store 1028, or a social networking site 1030.

A vocal analysis engine or component 1020 may be employed by a client that communicates with server device 1002. Additionally, or alternatively, vocal processing engine or component 1021, harmonization engine or component 1022, and/or full song arrangement engine or component 1023 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these examples of the computing devices may obtain content from the store 1016, in addition to receiving graphical data useable to be either pre-processed at a graphic-originating system, or post-processed at a receiving computing system.

Figure 11:
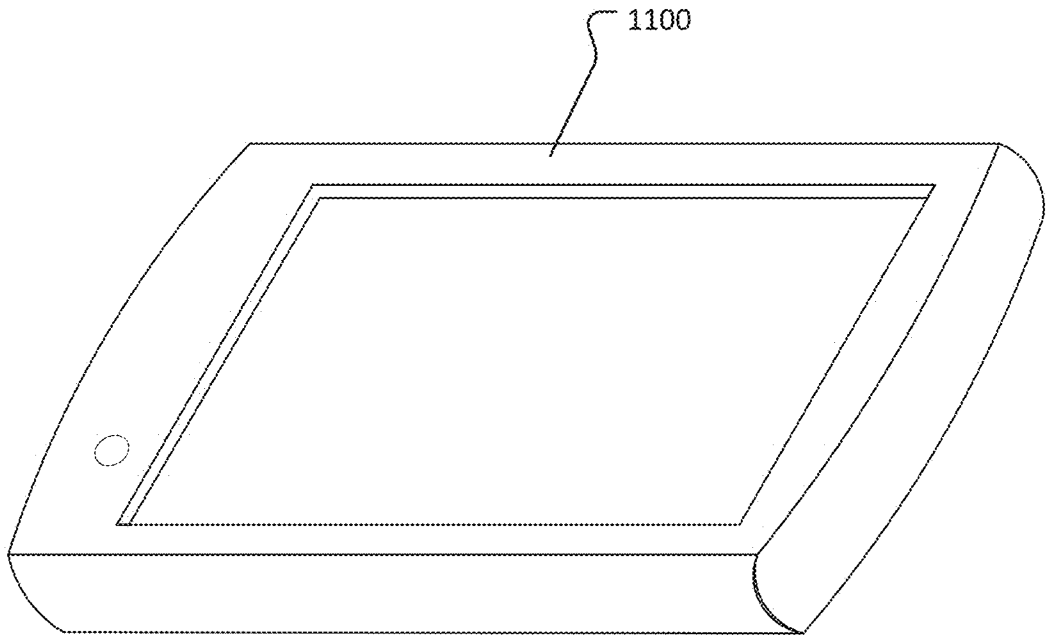
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for converting audio samples to full song arrangements, the method comprising:

receiving audio sample data;

determining a melodic transcription with a plurality of bars, based on the audio sample data;

determining a sequence of music chords, based on the melodic transcription, wherein the determining of the sequence of music chords comprises:

inputting the melodic transcription to a machine learning model, the machine learning model being trained based on a dataset of paired melody bars and chords;

receiving from the machine learning model, a plurality of chord candidates for each bar of the plurality of bars of the melodic transcription;

determining, from pre-defined chord progressions, one or more chord progressions corresponding to the plurality of chord candidates for each bar of the plurality of bars of the melodic transcription; and selecting the sequence of music chords from the determined one or more chord progressions;

performing vocal processing on the audio sample data by dynamically time warping the audio sample data to fit the determined sequence of music chords; and generating a full song arrangement, based on the sequence of music chords and the vocally processed audio sample data.

2. The method of claim 1, wherein the pre-defined chord progressions are 4-bar chord progressions.

3. The method of claim 1, wherein the trained machine learning model is a neural network.

4. The method of claim 3, wherein the chords in the data set include maj, min, 7, min7, min7b5, aug, and sus4.

5. The method of claim 1, further comprising:

displaying a user-interface;

receiving, via the user-interface, a user-input corresponding to a selection of an accompaniment style of the full song arrangement; and re-generating the full song arrangement, based on the user-input.

6. The method of claim 1, wherein the audio sample data includes a subset of data corresponding to auditory words.

7. The method of claim 1, wherein the vocal processing further comprises:

removing a subset of the audio sample data corresponding to ambient noise.

8. The method of claim 7, wherein the generating of the full song arrangement is based on the sequence of music chords, and the vocally processed audio sample data.

9. The method of claim 7, wherein the vocal processing further comprises:

performing autotuning on the audio sample data; and normalizing a volume of the audio sample data.

10. The method of claim 9, wherein the vocal processing further comprises:

beautifying the audio sample data, by applying one or more vocal effects from the group of: compressor adjustment, reverb adjustment, and chorus adjustment.

11. The method of claim 1, further comprising:

receiving the audio sample data from an application on a mobile computing device; and transmitting the full song arrangement to the mobile computing device.

12. A system for converting audio samples to full song arrangements, the system comprising:

at least one processor; and memory storing instructions that, when executed by the at least one processor, causes the system to perform a set of operations, the set of operations including:

receiving audio sample data;

determining a melodic transcription with a plurality of bars, based on the audio sample data;

determining a sequence of music chords, based on the melodic transcription, wherein the determining of the sequence of music chords comprises:

inputting the melodic transcription to a machine learning model, the machine learning model being trained based on a dataset of paired melody bars and chords;

receiving from the machine learning model, a plurality of chord candidates for each bar of the plurality of bars of the melodic transcription;

determining, from pre-defined chord progressions, one or more chord progressions corresponding to the plurality of chord candidates for each bar of the plurality of bars of the melodic transcription; and selecting the sequence of music chords from the determined one or more chord progressions;

performing vocal processing on the audio sample data by dynamically time warping the audio sample data to fit the determined sequence of music chords; and generating a full song arrangement, based on the sequence of music chords and the vocally processed audio sample data.

13. The system of claim 12, wherein the pre-defined chord progressions are 4-bar chord progressions.

14. The method of claim 12, wherein the trained machine learning model is a neural network.

15. The method of claim 12, wherein the vocal processing further comprises:

removing a subset of the audio sample data corresponding to ambient noise; and performing autotuning on the audio sample data.

16. The method of claim 15, wherein the generating of the full song arrangement is based on the sequence of music chords, and the vocally processed audio sample data.

17. The method of claim 15, wherein the vocal processing further comprises:

normalizing a volume of the audio sample data; and beautifying the audio sample data, by applying one or more vocal effects from the group of: compressor adjustment, reverb adjustment, and chorus adjustment.

18. One or more computer readable non-transitory storage media embodying software that is operable when executed, by at least one processor of a device, to:

receive audio sample data;

determine a melodic transcription with a plurality of bars, based on the audio sample data;

determine a sequence of music chords, based on the melodic transcription, wherein to determine the sequence of music chords comprises:

inputting the melodic transcription to a machine learning model, the machine learning model being trained based on a dataset of paired melody bars and chords;

receiving from the machine learning model, a plurality of chord candidates for each bar of the plurality of bars of the melodic transcription;

determining, from pre-defined chord progressions, one or more chord progressions corresponding to the plurality of chord candidates for each bar of the plurality of bars of the melodic transcription; and selecting the sequence of music chords from the determined one or more chord progressions;

perform vocal processing on the audio sample data by dynamically time warping the audio sample data to fit the determined sequence of music chords; and generate a full song arrangement, based on the sequence of music chords and the vocally processed audio sample data.

19. The method of claim 1, further comprising:

estimating a beats per minute of the audio sample data, wherein the dynamic time warping is performed based on the estimates beats per minute.

20. The method of claim 1, wherein the selecting the sequence of music chords from the determined one or more chord progressions comprises:

ranking the determined one or more chord progressions based on a probability of how well each chord progression of the one or more chord progressions matches the plurality of bars; and selecting the sequence of music chords based on their ranking.

* * * * *